(12) United States Patent
Liao et al.

(10) Patent No.: US 11,120,524 B2
(45) Date of Patent: Sep. 14, 2021

(54) VIDEO CONFERENCING SYSTEM AND VIDEO CONFERENCING METHOD

(71) Applicant: Wistron Corporation, New Taipei (TW)

(72) Inventors: Chiu-Ting Liao, New Taipei (TW); Yu-Chen Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 36 days.

(21) Appl. No.: 16/739,118

(22) Filed: Jan. 10, 2020

(65) Prior Publication Data
US 2021/0133923 A1     May 6, 2021

(30) Foreign Application Priority Data

Oct. 30, 2019 (TW) ................................ 108139159

(51) Int. Cl.
*H04N 7/15*     (2006.01)
*G06T 3/40*     (2006.01)
(Continued)

(52) U.S. Cl.
CPC ........ *G06T 3/4038* (2013.01); *G06K 9/00255* (2013.01); *H04M 3/567* (2013.01); *H04N 7/142* (2013.01)

(58) Field of Classification Search
CPC .. G06T 3/40; H04M 3/56; G06K 9/00; H04N 7/14; H04N 7/15
(Continued)

(56) References Cited

U.S. PATENT DOCUMENTS

| 8,730,296 B2 | 5/2014 | Zhan et al. |
| 10,057,542 B2 * | 8/2018 | Segal ............... H04N 7/155 |

(Continued)

FOREIGN PATENT DOCUMENTS

| CN | 101442654 | 5/2012 |
| CN | 107980221 | 5/2018 |

(Continued)

OTHER PUBLICATIONS

"Office Action of Taiwan Counterpart Application", dated Sep. 1, 2020, p. 1-p. 10.

*Primary Examiner* — Melur Ramakrishnaiah
(74) *Attorney, Agent, or Firm* — JCIPRNET

(57) ABSTRACT

The invention provides a video conferencing system and a video conferencing method. The video conferencing system includes a sound sensor, an omnidirectional camera, and a processor. The sound sensor senses a first sound source and a second sound source, to provide a first positioning coordinate corresponding to the first sound source and a second positioning coordinate corresponding to the second sound source. The omnidirectional camera captures an omnidirectional conference image. The processor acquires a first facial image and a second facial image from the omnidirectional conference image according to the first positioning coordinate and the second positioning coordinate. The processor determines an image stitching order according to positions of the first facial image and the second facial image respectively in the omnidirectional conference image to generate a close-up conference image.

18 Claims, 5 Drawing Sheets

(51) Int. Cl.
  *H04N 7/14* (2006.01)
  *G06K 9/00* (2006.01)
  *H04M 3/56* (2006.01)

(58) Field of Classification Search
  USPC .............................. 382/284; 348/14.01–14.16
  See application file for complete search history.

(56) References Cited

U.S. PATENT DOCUMENTS

| | | | |
|---|---|---|---|
| 2007/0263076 A1* | 11/2007 | Andrews | H04N 7/148 |
| | | | 348/14.08 |
| 2011/0249085 A1* | 10/2011 | Zhan | H04N 7/147 |
| | | | 348/14.08 |
| 2016/0292884 A1 | 10/2016 | Schnittman et al. | |
| 2016/0295128 A1 | 10/2016 | Schnittman et al. | |
| 2017/0078616 A1* | 3/2017 | Uchiyama | H04N 5/23238 |

FOREIGN PATENT DOCUMENTS

| | | |
|---|---|---|
| TW | 201901527 | 1/2019 |
| WO | 2016161288 | 10/2016 |

* cited by examiner

VIDEO CONFERENCING SYSTEM AND VIDEO CONFERENCING METHOD

CROSS-REFERENCE TO RELATED APPLICATION

This application claims the priority benefit of Taiwan application serial no. 108139159, filed on Oct. 30, 2019. The entirety of the above-mentioned patent application is hereby incorporated by reference herein and made a part of this specification.

BACKGROUND OF THE INVENTION

1. Field of the Invention

The invention relates to an image processing technology, and in particular, to a video conferencing system and a video conferencing method.

2. Description of Related Art

To meet a requirement of multi-person conferences at different positions, various video conferencing systems that can provide a video function are constantly developed. However, in a conventional video conferencing system, when a plurality of participants is in the same conference room, all the persons in the same conference room are included in a single conference image. Consequently, conference participants in another remote conference room cannot concentrate on key points of the conference. Particularly, when two conference participants in the conference are having an important dialog, the conference participants in the another remote conference room cannot concentrate on the two conference participants having the dialog. In view of this, the following provides several solutions of embodiments.

SUMMARY OF THE INVENTION

Embodiments of the invention provide a video conferencing system and a video conferencing method, which can automatically sense a plurality of conference participants that are talking, and can automatically generate a corresponding close-up conference image, to provide a favorable video conferencing effect.

The video conferencing system in the embodiments of the invention includes a sound sensor, an omnidirectional camera, and a processor. The sound sensor is configured to sense a first sound source and a second sound source, to provide a first positioning coordinate corresponding to the first sound source and a second positioning coordinate corresponding to the second sound source. The omnidirectional camera is configured to capture an omnidirectional conference image. The processor is coupled to the sound sensor and the omnidirectional camera, and is configured to acquire a first facial image and a second facial image from the omnidirectional conference image according to the first positioning coordinate and the second positioning coordinate. The processor determines an image stitching order according to positions of the first facial image and the second facial image respectively in the omnidirectional conference image. The processor stitches the first facial image and the second facial image in the image stitching order to generate a close-up conference image.

The video conferencing method in the embodiments of the invention includes the following steps: sensing a first sound source and a second sound source to provide a first positioning coordinate corresponding to the first sound source and a second positioning coordinate corresponding to the second sound source; capturing an omnidirectional conference image; acquiring a first facial image and a second facial image from the omnidirectional conference image according to the first positioning coordinate and the second positioning coordinate; and determining an image stitching order according to positions of the first facial image and the second facial image respectively in the omnidirectional conference image, and stitching the first facial image and the second facial image in the image stitching order to generate a close-up conference image.

Based on the foregoing, by means of the video conferencing system and the video conferencing method in the embodiments of the invention, two conference participants that are having a dialog can be automatically sensed, and a close-up conference image of the two conference participants can be provided.

To make the foregoing features and advantages of the invention clearer and more comprehensible, the following provides detailed descriptions by using the embodiments and with reference to the accompanying drawings.

DESCRIPTION OF THE EMBODIMENTS

Figure 1:
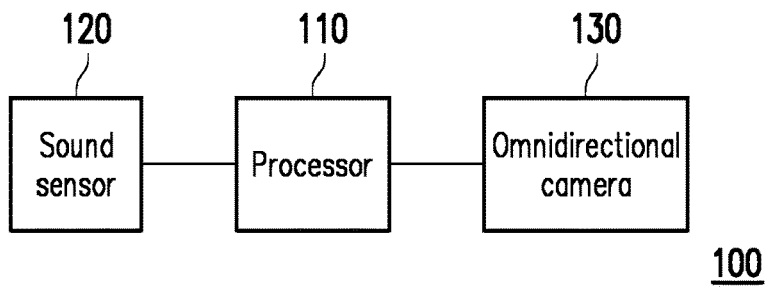
FIG. 1 is a schematic block diagram of a video conferencing system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of a video conferencing system according to an embodiment of the invention. Referring to FIG. 1, the video conferencing system 100 includes a processor 110, a sound sensor 120, and an omnidirectional camera 130. The processor 110 is coupled to the sound sensor 120 and the omnidirectional camera 130. In the present embodiment, the processor 110 may be, for example, a central processing unit (CPU), a general-purpose or dedicated programmable microprocessor, a digital signal processor (DSP), a programmable controller, an application-specific integrated circuit (ASIC), a programmable logic device (PLD), another similar processing device, or a combination thereof. The sound sensor 120 may include a microphone array or one or more directional microphones, and may be configured to sense a plurality of sound sources in an environment to provide positioning coordinates of the plurality of sound sources to the processor 110 in real time.

The omnidirectional camera 130 may provide a real-time 360-degree omnidirectional conference image to the processor 110.

In the present embodiment, the processor 110 may be further coupled to a memory. The memory may be, for example, a dynamic random access memory (DRAM), a flash memory, or a non-volatile random access memory (NVRAM), and the memory may, for example, store image data, sound data, and position data described in the embodiments of the invention, and a relevant image processing program that can implement the invention, and the like, for the processor 110 to read and execute. It should be noted that, the positioning coordinate in the embodiments of the invention may be, for example, a data format of coordinates (x, y), and the processor 110 may record, into a data array of the memory, the plurality of positioning coordinates sequentially provided by the sound sensor 120 and in combination with their respective corresponding timestamps, for the processor 110 to selectively read and use when the processor 110 performs the following relevant determining and relevant data processing in the embodiments.

In the present embodiment, the video conferencing system 100 may be a video conferencing device, and the processor 110, the sound sensor 120, and the omnidirectional camera 130 may be integrated into one device body. The video conferencing device may be, for example, disposed in a central position in a conference space, or for example, a central position in a conference table, so that a plurality of conference participants surround the video conferencing device. The video conferencing device may sense sounds and an omnidirectional conference image of the plurality of surrounding conference participants. However, the video conferencing system in the invention is not limited to being integrated in a single device form. In an embodiment, the processor 110 may be alternatively disposed in a computer host or a cloud host, and connected to the sound sensor 120 and the omnidirectional camera 130 in a wired or wireless manner. The sound sensor 120 and the omnidirectional camera 130 may be, for example, disposed in the central position in the conference space, or for example, the central position in the conference room, to help sense the sounds and the omnidirectional conference image of the plurality of surrounding conference participants. In addition, positions and setting manners of the video conferencing system 100, the sound sensor 120, and the omnidirectional camera 130 in the conference room are not limited in the invention.

In the present embodiment, when the video conferencing system 100 is started, the sound sensor 120 of the video conferencing system 100 may sense a first sound source and a second sound source that are having a dialog to provide a first positioning coordinate corresponding to the first sound source and a second positioning coordinate corresponding to the second sound source. In addition, the omnidirectional camera 130 may capture an omnidirectional conference image, and provide the omnidirectional conference image to the processor 110. In the present embodiment, the processor 110 may acquire a first facial image and a second facial image from the omnidirectional conference image according to a first positioning coordinate and a second positioning coordinate. Subsequently, the processor 110 may determine an image stitching order according to an angle between a first angle position and a second angle position of the first facial image and the second facial image respectively in the omnidirectional conference image. In the present embodiment, the processor 110 may stitch the first facial image and the second facial image according to the image stitching order to generate a close-up conference image.

Figure 2:
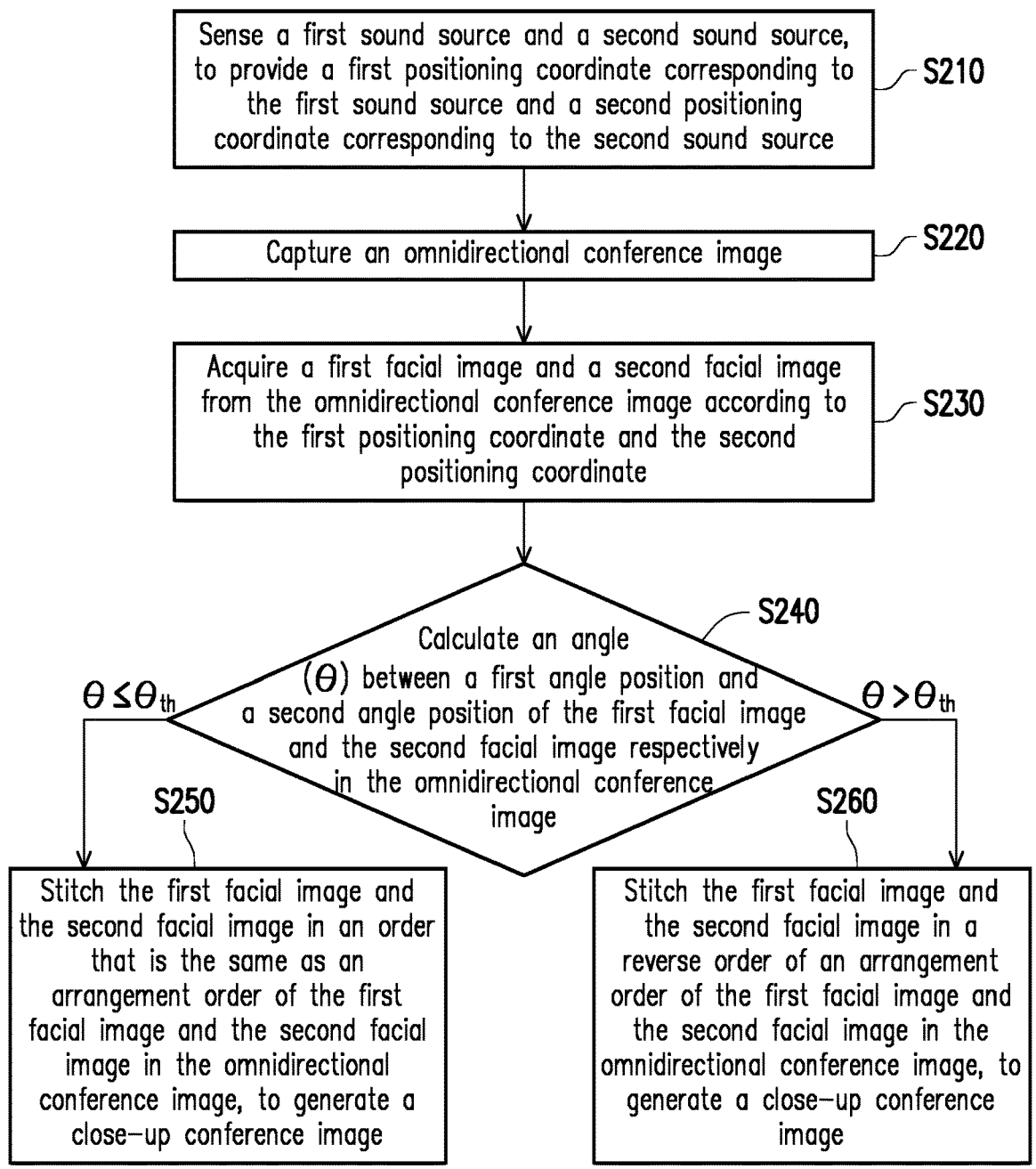
FIG. 2 is a flowchart of a video conferencing method according to an embodiment of the invention.

FIG. 2 is a flowchart of a video conferencing method according to an embodiment of the invention. Referring to FIG. 2, and referring to FIG. 1 and FIG. 2, the video conferencing method in the present embodiment may be applied to at least the video conferencing system 100 in FIG. 1, so that the video conferencing system 100 may perform the following steps S210 to S260 to provide a favorable video conferencing effect. In step S210, the sound sensor 120 may sense a first sound source and a second sound source that are in a dialog scenario to provide a first positioning coordinate corresponding to the first sound source and a second positioning coordinate corresponding to the second sound source to the processor 110. In step S220, the omnidirectional camera 130 may capture an omnidirectional conference image, and provide the omnidirectional conference image to the processor 110. In step S230, the processor 110 acquires a first facial image and a second facial image from the omnidirectional conference image according to the first positioning coordinate and the second positioning coordinate. In step S240, the processor 110 calculates an angle ($\theta$) between a first angle position and a second angle position of the first facial image and the second facial image respectively in the omnidirectional conference image. For example, the processor 110 may subtract the first angle position from the second angle position and obtain an absolute value to obtain the angle ($\theta$).

In the present embodiment, the processor 110 determines an image stitching order according to the angle between the first angle position and the second angle position of the first facial image and the second facial image respectively in the omnidirectional conference image, and stitches the first facial image and the second facial image in the image stitching order to generate a close-up conference image. In this way, when the processor 110 determines that the angle ($\theta$) is smaller than or equal to a preset angle threshold ($\theta_{th}$), the processor 110 performs step S250. In step S250, the processor 110 stitches the first facial image and the second facial image in an order that is the same as an arrangement order of the first facial image and the second facial image in the omnidirectional conference image to generate a close-up conference image.

On the contrary, when the processor 110 determines that the angle ($\theta$) is greater than the preset angle threshold ($\theta_{th}$), the processor 110 performs step S260. In step S260, the processor 110 stitches the first facial image and the second facial image in a reverse order of an arrangement order of the first facial image and the second facial image in the omnidirectional conference image to generate a close-up conference image. Therefore, by means of the video conferencing method and the video conferencing system 100 in the present embodiment, a close-up conference image of two conference participants that are having a dialog can be automatically and effectively provided, to provide a favorable video conferencing effect. In addition, the following describes execution scenarios of step S210 to S260 and a stitching result of the close-up conference image by using two example embodiments of FIG. 3A to FIG. 3C and FIG. 4A to FIG. 4C.

Figure 3A:
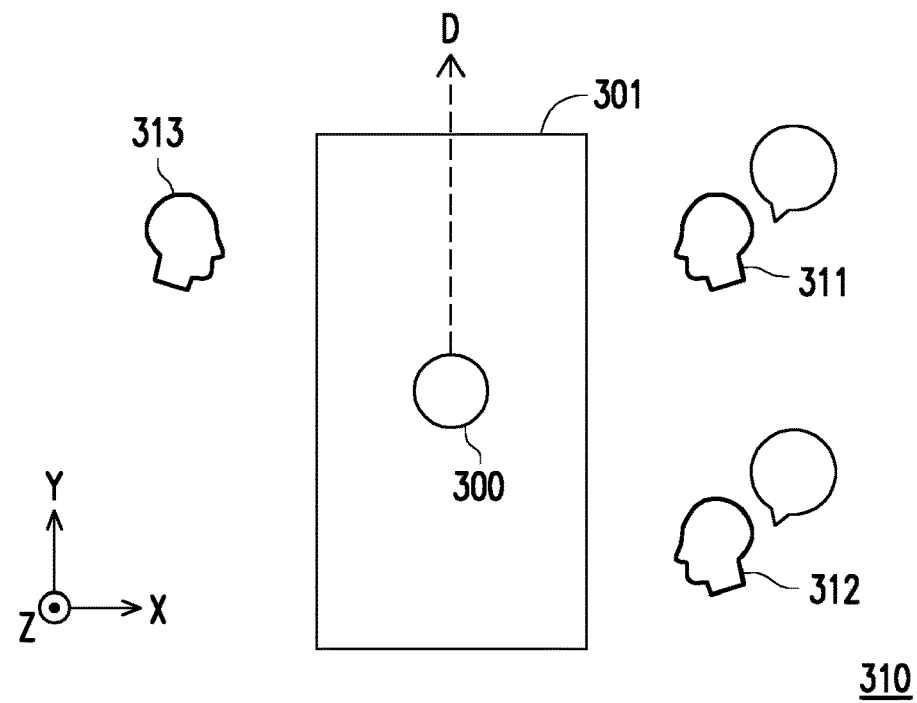
FIGS. 3A to 3C are each a schematic diagram of a conference scenario according to an embodiment of the invention.
Figure 3B:
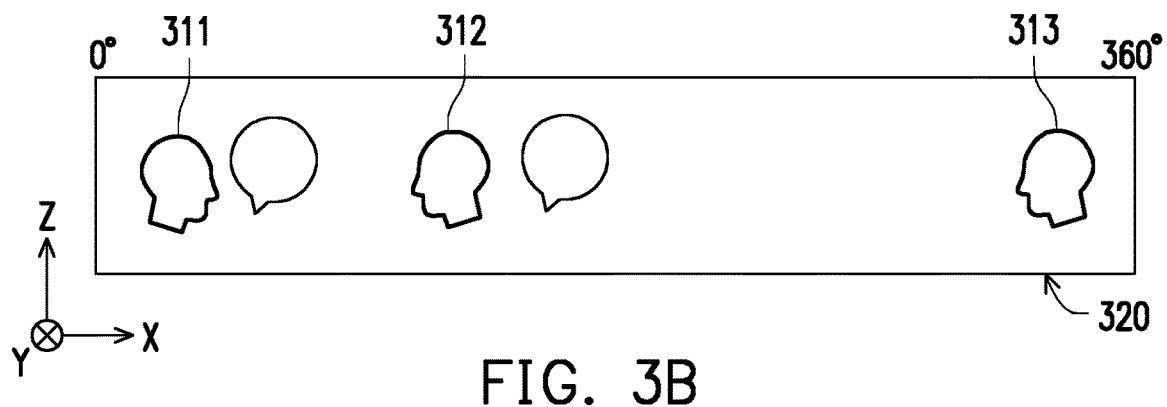
Figure 3C:
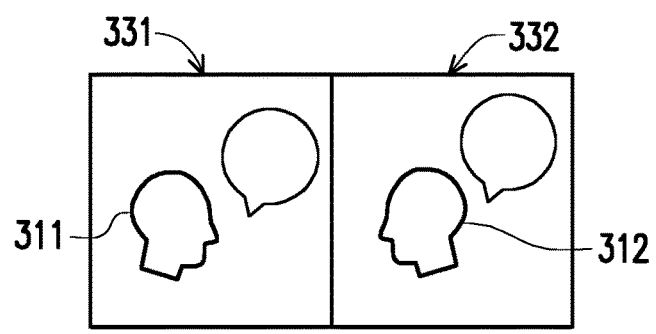

FIGS. 3A to 3C are each a schematic diagram of a conference scenario according to an embodiment of the invention. Referring to FIG. 2 and FIGS. 3A to 3C, in the present embodiment, the conference scenario 310 may be, for example, a conference room, and include conference participants 311 to 313. The conference participants 311 to 313 are, for example, located around a conference table 301.

A table surface of the conference table 301 is, for example, parallel to a horizontal plane formed by extension of a direction X and a direction Y, and a direction Z is perpendicular to the horizontal plane. In the present embodiment, the video conferencing system 300 may be, for example, disposed in a central position in the conference table 301, and an image capturing reference D of the video conferencing system 300 faces the direction Y. In the conference scenario 310, when the conference participants 311 and 312 are having a dialog, a sound sensor of the video conferencing system 300 may sense the conference participants 311 and 312 that are in a dialog scenario to obtain two positioning coordinates corresponding to the conference participants 311 and 312 (step S210). An omnidirectional camera of the video conferencing system 300 may capture an omnidirectional conference image 320 of the conference scenario 310 (step S220). Therefore, the video conferencing system 300 in the present embodiment may acquire facial images 331 and 332 from the omnidirectional conference image 320 according to the two positioning coordinates corresponding to the conference participants 311 and 312 (step S230).

In the present embodiment, the video conferencing system 300 may calculate an angle (θ) between two angle positions of the facial images 331 and 332 corresponding to the two positioning coordinates of the conference participants 311 and 312 respectively in the omnidirectional conference image 320 (step S240), and the video conferencing system 300 may set a preset angle threshold ($\theta_{th}$), where the preset angle threshold ($\theta_{th}$) is, for example, 180 degrees. FIG. 3B shows the omnidirectional conference image captured by the omnidirectional camera starting from the image capturing reference D in a clockwise direction from 0 degrees to 360 degrees. In the omnidirectional conference image 320 in the present embodiment, the conference participant 311 and the conference participant 312 do not cross the image capturing reference D (0 degrees), and the angle (θ) between the two angle positions corresponding to the conference participants 311 and 312 is smaller than 180 degrees. Therefore, the video conferencing system 300 stitches the facial images 331 and 332 in an order that is the same as an arrangement order of the facial images 331 and 332 in the omnidirectional conference image 320 to generate a close-up conference image 330 (step S250). Therefore, the video conferencing system 300 in the present embodiment can automatically and effectively provide a face-to-face close-up conference image of the two conference participants 311 and 312 that are having a dialog to provide a favorable video conferencing effect.

Figure 4A:
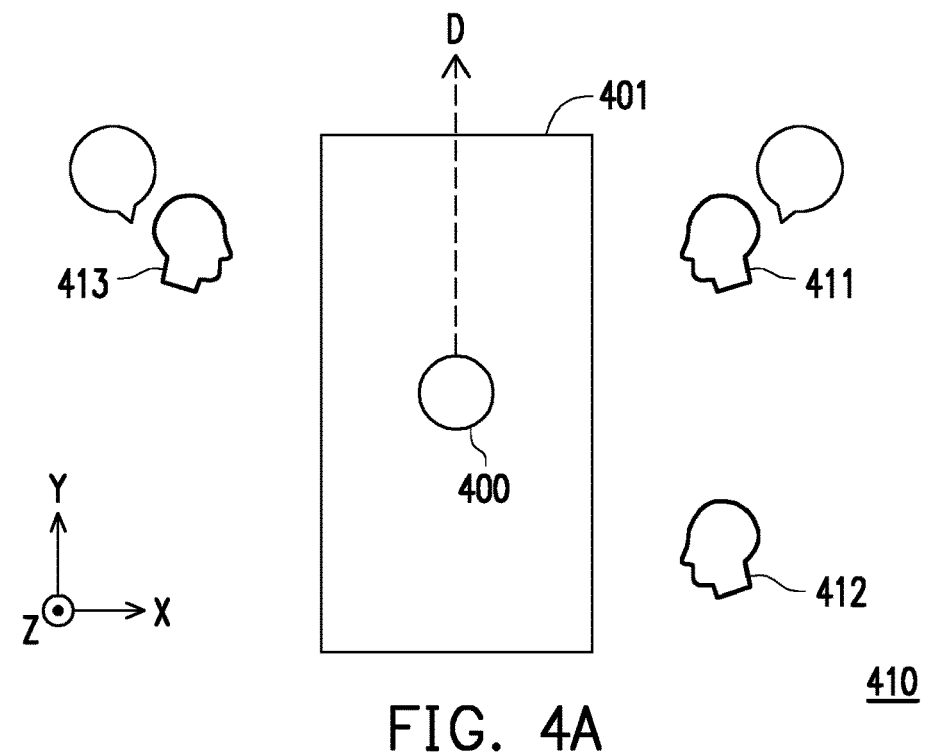
FIGS. 4A to 4C are each a schematic diagram of a conference scenario according to another embodiment of the invention.
Figure 4B:
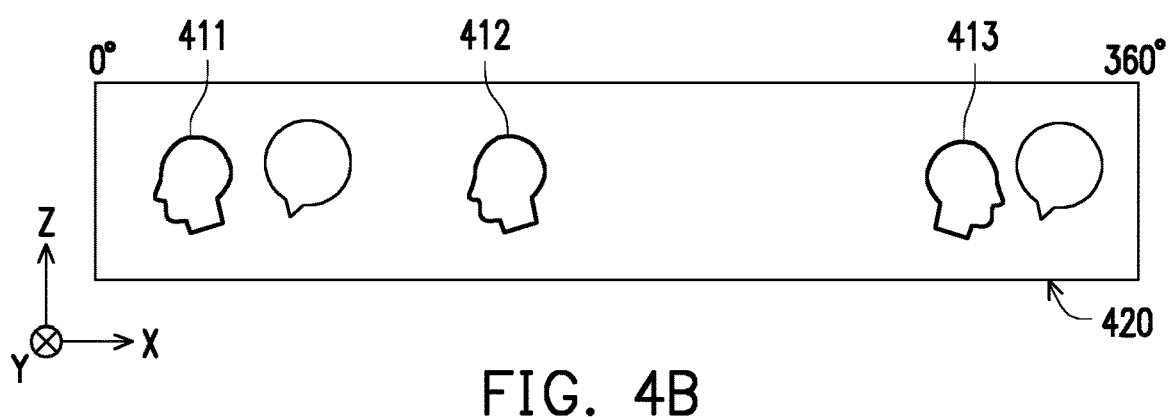
Figure 4C:
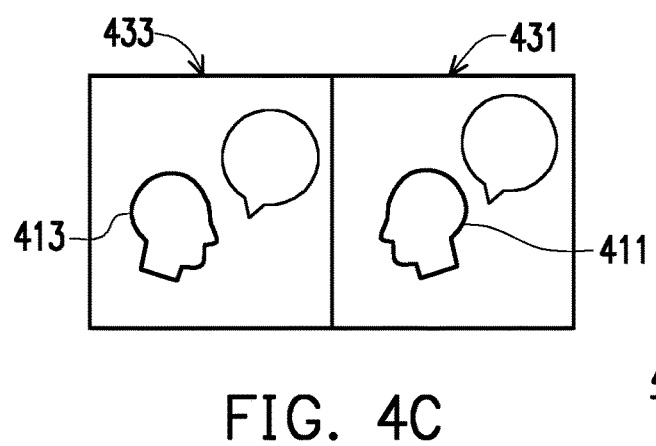

FIGS. 4A to 4C are each a schematic diagram of a conference scenario according to another embodiment of the invention. Referring to FIGS. 4A to 4C, in the present embodiment, the conference scenario 410 may be, for example, a conference room, and include conference participants 411 to 413. The conference participants 411 to 413 are, for example, located around a conference table 401. Compared with the embodiment of FIGS. 3A to 3C, in the conference scenario 410, when the conference participants 411 and 413 are having a dialog, a sound sensor of the video conferencing system 400 may sense the conference participants 411 and 413 that are in a dialog scenario to obtain two positioning coordinates corresponding to the conference participants 411 and 413 (step S210). An omnidirectional camera of the video conferencing system 400 may capture an omnidirectional conference image 420 of the conference scenario 410 (step S220). Therefore, the video conferencing system 400 in the present embodiment may acquire facial images 431 and 433 from the omnidirectional conference image 420 according to the two positioning coordinates corresponding to the conference participants 411 and 413 (step S230).

In the present embodiment, the video conferencing system 400 may calculate an angle (θ) between two angle positions of the facial images 431 and 433 corresponding to the two positioning coordinates of the conference participants 411 and 413 respectively in the omnidirectional conference image 420 (step S240), and the video conferencing system 400 may set a preset angle threshold ($\theta_{th}$), where the preset angle threshold ($\theta_{th}$) is, for example, 180 degrees. FIG. 4B shows the omnidirectional conference image captured by the omnidirectional camera starting from the image capturing reference D in a clockwise direction from 0 degrees to 360 degrees. In the omnidirectional conference image 420 in the present embodiment, the conference participants 411 and the conference participant 413 cross the image capturing reference D (where an azimuth angle is 0 degrees) to have a face-to-face dialog, and the angle (θ) between the two angle positions corresponding to the conference participants 411 and 413 that is calculated from the omnidirectional conference image 420 is greater than 180 degrees. Therefore, the video conferencing system 400 stitches the facial images 431 and 433 in a reverse order of an arrangement order of the facial images 431 and 433 in the omnidirectional conference image 420 to generate a close-up conference image 430 (step S260). Therefore, the video conferencing system 400 in the present embodiment can automatically and effectively provide a face-to-face close-up conference image of the two conference participants 411 and 413 that are having a dialog to provide a favorable video conferencing effect.

Figure 5:
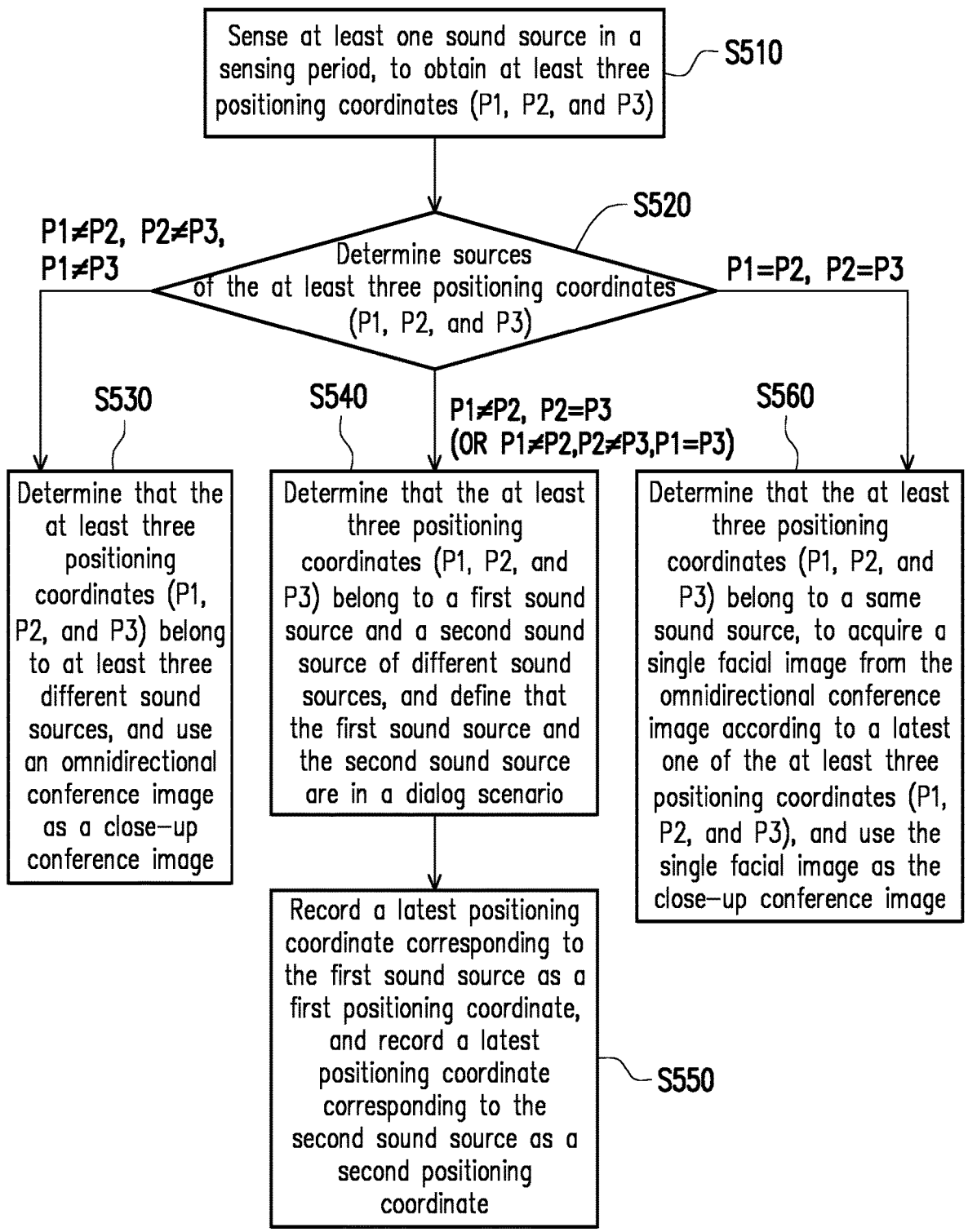
FIG. 5 is a flowchart of a video conferencing method according to another embodiment of the invention.

FIG. 5 is a flowchart of a video conferencing method according to another embodiment of the invention. Referring to FIG. 1 and FIG. 5, the video conferencing method in the present embodiment may be applied to at least the video conferencing system 100 in FIG. 1, so that the video conferencing system 100 may perform the following steps S510 to S560 to provide a plurality of video conferencing effects for different scenarios. After the video conferencing system 100 is started, in step S510, the sound sensor 120 senses at least one sound source in a sensing period to obtain at least three positioning coordinates (P1, P2, and P3), and provide them to the processor 110. It should be noted that, the sound sensor 120 obtains, for example, the at least three positioning coordinates (P1, P2, and P3) in a sequential order, and therefore, there is an order among timestamps corresponding to the at least three positioning coordinates (P1, P2, and P3). In step S520, the processor 110 may compare the at least three positioning coordinates (P1, P2, and P3) to determine sources of the at least three positioning coordinates (P1, P2, and P3).

It should be noted that, the sound sensor 120 positions each sensed sound signal in a continuous sensing manner in the sensing period to continuously output positioning coordinates to the processor 110. Therefore, for example, if the sound sensor 120 senses two sound signals provided by the same sound source, the sound sensor 120 provides two identical or similar positioning coordinates corresponding to the same sound source. On the contrary, if the sound sensor 120 senses two sound signals provided by two different sound sources, the sound sensor 120 provides two different positioning coordinates corresponding to the two different sound sources.

In a first scenario of the present embodiment, if the processor 110 determines, through comparison, that the at least three positioning coordinates (P1, P2, and P3) are all different from one another, for example, P1≠P2, P2≠P3, and P1≠P3, the processor 110 performs step S530. In step S530, the processor 110 determines that the at least three positioning coordinates (P1, P2, and P3) belong to at least three different sound sources, and uses the omnidirectional conference image as a close-up conference image. In other words, the first scenario is not a dialog scenario of two conference participants, and in the first scenario, there is a case in which a plurality of persons speaks. Therefore, the video conferencing system 100 plays the omnidirectional conference image.

In a second scenarios of the present embodiment, if the processor 110 determines, through comparison, that at least two of the at least three positioning coordinates (P1, P2, and P3) are the same, and at least two positioning coordinates are different, the processor 110 performs step S540. In a first example, if the processor 110 determines, for example, that P1 belongs to a first sound source, and P2 and P3 belong to a second sound source (P1≠P2, and P2=P3), the processor 110 performs step S540. In a second example, if the processor 110 determines, for example, that P1 and P3 belong to a first sound source, and P2 belongs to a second sound source (P1≠P2, P2≠P3, and P1=P3), the processor 110 also performs step S540. It should be noted that, both the first example and the second example may be determined by the processor 110 as dialog scenarios. However, in an embodiment, compared with the first example, the second example is preferentially determined as a dialog scenario. This is because in the second example, the first sound source sounds first, then the second sound source sounds, and finally the first sound source sounds again. In other words, in the second example, it is clearer that two conference participants are having a "dialog". In step S540, the processor 110 determines that the at least three positioning coordinates (P1, P2, and P3) belong to a first sound source and a second sound source of different sound sources, and defines that the first sound source and the second sound source are in a dialog scenario. In step S550, the processor 110 records a latest positioning coordinate corresponding to the first sound source as a first positioning coordinate, and records a latest positioning coordinate corresponding to the second sound source as a second positioning coordinate. In addition, the processor 110 continuously performs step S210 to S260 in FIG. 2 to generate a close-up conference image.

In a third scenario of the present embodiment, if the processor 110 determines, through comparison, that the at least three positioning coordinates (P1, P2, and P3) are all the same, for example, P1=P2, and P2=P3, the processor 110 performs step S560. In step S560, the processor 110 determines that the at least three positioning coordinates (P1, P2, and P3) belong to the same sound source to acquire a corresponding single facial image from the omnidirectional conference image according to a latest one of the at least three positioning coordinates (P1, P2, and P3), and uses the single facial image as the close-up conference image. In this way, for example, the sound sensor 120 sequentially obtains the three positioning coordinates P1, P2, and P3, and therefore, the processor 110 may, for example, acquire a corresponding single facial image from the omnidirectional conference image according to a positioning coordinate of P3. In other words, the third scenario is not a dialog scenario of two conference participants, and in the third scenario, there is a case in which a single person speaks. Therefore, the video conferencing system 100 plays a facial image corresponding to the single person as a close-up conference image.

Figure 6:
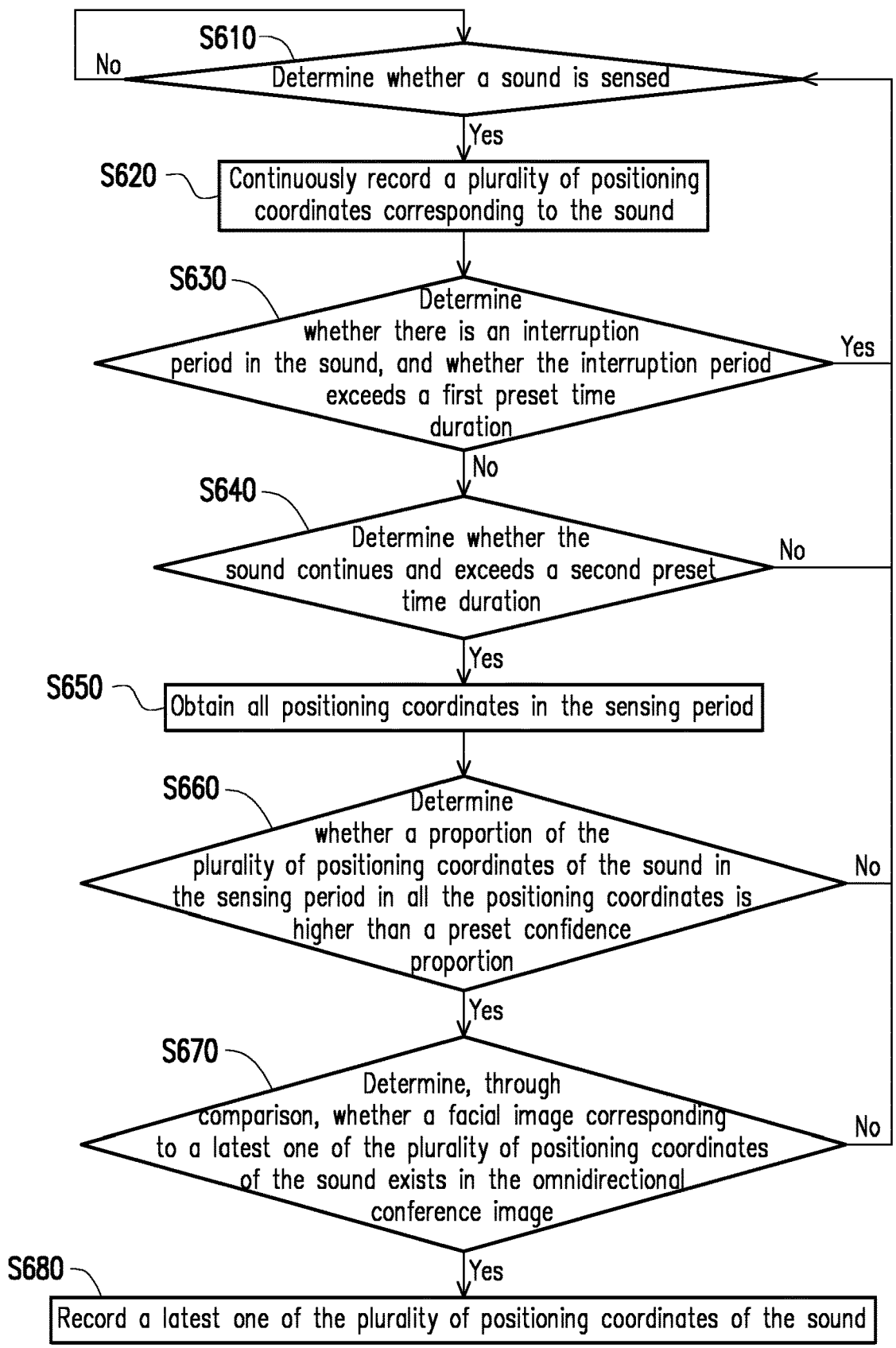
FIG. 6 is a flowchart of a recorded valid positioning coordinate according to an embodiment of the invention.

FIG. 6 is a flowchart of a recorded valid positioning coordinate according to an embodiment of the invention. Referring to FIG. 1 and FIG. 6, a video conferencing method in the present embodiment may be applied to at least the video conferencing system 100 in FIG. 1, so that the video conferencing system 100 may perform the following steps S610 to S680 to effectively define a sound source. In step S610, the processor 110 determines, by using the sound sensor 120, whether a sound is sensed. If no sound is sensed, the processor 110 continuous to perform step S610. If a sound is sensed, the processor 110 performs step S620. In step S620, the processor 110 continuously records a plurality of positioning coordinates corresponding to the sound. In step S630, the processor 110 determines whether there is an interruption period in the sound, and whether the interruption period exceeds a first preset time duration. If yes, it indicates that the sound may not be a speech sound of a conference participant, and the processor 110 performs step S610 again. If no, it indicates that the sound may be a speech sound of a conference participant, and the processor 110 performs step S640.

In step S640, the processor 110 determines whether the sound continues and exceeds a second preset time duration. If no, the processor 110 considers the sound as an invalid speech sound, and the processor 110 performs step S610 again. If yes, the processor 110 considers the sound as a valid speech sound, and the processor 110 performs step S650. In step S650, the processor 110 obtains all positioning coordinates in the sensing period by using the sound sensor 120. In step S660, the processor 110 determines whether a proportion of the plurality of positioning coordinates of the sound in the sensing period in all the positioning coordinates is higher than a preset confidence proportion. If no, the processor 110 performs step S610 again. If yes, the processor 110 performs step S670.

Further, in step S660, the processor 110 obtains all positioning coordinates in the sensing period, sets a particular error angle range, and uses a plurality of positioning coordinates within the error angle range as the plurality of positioning coordinates of the sound, where the error angle range is, for example, plus or minus 10 degrees. In other words, because the plurality of positioning coordinates of the same sound source that is continuously sensed by the sound sensor 120 may slightly change, the processor 110 may consider all the plurality of positioning coordinates within the error angle range as from the same sound source. In addition, in the present embodiment, the preset confidence proportion may be, for example, 85%. In other words, to avoid incorrect determining, the video conferencing system 100 in the present embodiment uses a sound corresponding to a particular sound source and currently accounting for a proportion of more than 85% of all sounds as an effective speech sound.

In step S670, the processor 110 determines, through comparison, whether a facial image corresponding to a latest one of the plurality of positioning coordinates of the sound exists in the omnidirectional conference image. If no, the processor 110 performs step S610 again. If yes, the processor 110 performs step S680. In step S680, the processor 110 records a latest one of the plurality of positioning coordinates of the sound. In other words, to avoid incorrect determining, the video conferencing system 100 in the present embodiment finally compares sound and image determining results. Therefore, the video conferencing system 100 in the present embodiment may record a valid positioning coordinate, and the recorded valid positioning coordinate may be applied to one of the at least three positioning coordinates in the embodiment of FIG. 5, or applied to the first positioning coordinate or the second positioning coordinate in the embodiment of FIG. 2.

Based on the foregoing, by means of the video conferencing system and the video conferencing method in the invention, one, two, or more conference participants in a current conference scenario may be automatically sensed, to provide a corresponding conference image. Particularly, the video conferencing system and the video conferencing method in the invention may provide a close-up conference image for a particular scenario in which two conference participants have a dialog to provide a favorable video conferencing effect.

Although the invention has been disclosed by using the foregoing embodiments, it is not intended to limit the invention. A person of ordinary skill in the art may make some changes and modifications without departing from the spirit and scope of the invention. Therefore, the protection scope of the invention should be subject to the scope of the appended claims.

What is claimed is:

1. A video conferencing system, comprising:
   a sound sensor, configured to sense a first sound source and a second sound source to provide a first positioning coordinate corresponding to the first sound source and a second positioning coordinate corresponding to the second sound source;
   an omnidirectional camera, configured to capture an omnidirectional conference image; and
   a processor, coupled to the sound sensor and the omnidirectional camera, and configured to acquire a first facial image and a second facial image from the omnidirectional conference image according to the first positioning coordinate and the second positioning coordinate,
   wherein the processor determines an image stitching order by calculating an angle between a first angle position of the first facial image in the omnidirectional conference image and a second angle position of the second facial image in the omnidirectional conference image,
   wherein the processor stitches the first facial image and the second facial image based on the image stitching order to generate a close-up conference image.

2. The video conferencing system according to claim 1, wherein in response to a case in which the processor determines that the angle is smaller than or equal to a preset angle threshold, the processor stitches the first facial image and the second facial image in an order that is the same as an arrangement order of the first facial image and the second facial image in the omnidirectional conference image.

3. The video conferencing system according to claim 1, wherein in response to a case in which the processor determines that the angle is greater than a preset angle threshold, the processor stitches the first facial image and the second facial image in a reverse order of an arrangement order of the first facial image and the second facial image in the omnidirectional conference image.

4. The video conferencing system according to claim 2, wherein the preset angle threshold is 180 degrees.

5. The video conferencing system according to claim 1, wherein the processor senses at least one sound source by using the sound sensor to obtain at least three positioning coordinates, and in response to a case in which the processor determines that the at least three positioning coordinates belong to the first sound source and the second sound source of different sound sources, the processor determines that the first sound source and the second sound source are in a dialog scenario, and the processor records a latest positioning coordinate corresponding to the first sound source as the first positioning coordinate, and records a latest positioning coordinate corresponding to the second sound source as the second positioning coordinate.

6. The video conferencing system according to claim 5, wherein in response to a case in which the processor determines that the at least three positioning coordinates belong to a same sound source, the processor acquires a single facial image from the omnidirectional conference image according to a latest one of the at least three positioning coordinates, and uses the single facial image as the close-up conference image.

7. The video conferencing system according to claim 5, wherein in response to a case in which the processor determines that the at least three positioning coordinates belong to at least three different sound sources, the processor uses the omnidirectional conference image as the close-up conference image.

8. The video conferencing system according to claim 1, wherein in response to a case in which the sound sensor senses a sound in a sensing period, the processor continuously records a plurality of positioning coordinates corresponding to the sound, and determines whether there is an interruption period in the sound; in response to a case in which the interruption period exceeds a first preset time duration, the processor controls the sound sensor to perform re-sensing, and the processor determines whether the sound continues and exceeds a second preset time duration; and in response to a case in which the sound continues and exceeds the second preset time duration, the processor uses a latest one of the positioning coordinates of the sound as the first positioning coordinate of the first sound source or the second positioning coordinate of the second sound source.

9. The video conferencing system according to claim 8, wherein the processor obtains all positioning coordinates provided by the sound sensor in the sensing period, and the processor further determines whether a proportion of the positioning coordinates of the sound in the sensing period in all the positioning coordinates is higher than a preset confidence proportion, so as to use a latest one of the positioning coordinates of the sound as the first positioning coordinate of the first sound source or the second positioning coordinate of the second sound source.

10. A video conferencing method, comprising:
    sensing a first sound source and a second sound source to provide a first positioning coordinate corresponding to the first sound source and a second positioning coordinate corresponding to the second sound source;
    capturing an omnidirectional conference image;
    acquiring a first facial image and a second facial image from the omnidirectional conference image according to the first positioning coordinate and the second positioning coordinate;
    determining an image stitching order by calculating an angle between a first angle position of the first facial image in the omnidirectional conference image and a second angle position of the second facial image in the omnidirectional conference image; and
    stitching the first facial image and the second facial image according to the image stitching order to generate a close-up conference image.

11. The video conferencing method according to claim 10, wherein the step of generating the close-up conference image comprises:
    in response to a case in which the angle is smaller than or equal to a preset angle threshold, stitching the first facial image and the second facial image in an order that is the same as an arrangement order of the first facial image and the second facial image in the omnidirectional conference image.

12. The video conferencing method according to claim 10, wherein the step of generating the close-up conference image further comprises:
in response to a case in which the angle is greater than a preset angle threshold, stitching the first facial image and the second facial image in a reverse order of an arrangement order of the first facial image and the second facial image in the omnidirectional conference image.

13. The video conferencing method according to claim 11, wherein the preset angle threshold is 180 degrees.

14. The video conferencing method according to claim 10, wherein the step of sensing the first sound source and the second sound source comprises:
sensing at least one sound source to obtain at least three positioning coordinates;
in response to a case in which the at least three positioning coordinates belong to the first sound source and the second sound source of different sound sources, determining that the first sound source and the second sound source are in a dialog scenario; and
recording a latest positioning coordinate corresponding to the first sound source as the first positioning coordinate, and recording a latest positioning coordinate corresponding to the second sound source as the second positioning coordinate.

15. The video conferencing method according to claim 14, wherein the step of sensing the first sound source and the second sound source further comprises:
in response to a case in which the at least three positioning coordinates belong to a same sound source, acquiring a single facial image from the omnidirectional conference image according to a latest one of the at least three positioning coordinates, and using the single facial image as the close-up conference image.

16. The video conferencing method according to claim 14, wherein the step of sensing the first sound source and the second sound source further comprises:
in response to a case in which the at least three positioning coordinates belong to at least three different sound sources, using the omnidirectional conference image as the close-up conference image.

17. The video conferencing method according to claim 10, wherein the step of sensing the first sound source and the second sound source to provide the first positioning coordinate corresponding to the first sound source and the second positioning coordinate corresponding to the second sound source comprises:
in response to a case in which a sound is sensed in a sensing period, continuously recording a plurality of positioning coordinates corresponding to the sound;
determining whether there is an interruption period in the sound, and in response to a case in which the interruption period exceeds a first preset time duration, re-sensing the sound; and
determining whether the sound continues and exceeds a second preset time duration, and in response to a case in which the sound continues and exceeds the second preset time duration, using a latest one of the positioning coordinates of the sound as the first positioning coordinate of the first sound source or the second positioning coordinate of the second sound source.

18. The video conferencing method according to claim 17, wherein the step of sensing the first sound source and the second sound source to provide the first positioning coordinate corresponding to the first sound source and the second positioning coordinate corresponding to the second sound source further comprises:
obtaining all positioning coordinates in the sensing period; and
determining whether a proportion of the positioning coordinates of the sound in the sensing period in all the positioning coordinates is higher than a preset confidence proportion, so as to use a latest one of the positioning coordinates of the sound as the first positioning coordinate of the first sound source or the second positioning coordinate of the second sound source.

* * * * *